United States Patent [19]

Jackson

[11] Patent Number: 5,041,525

[45] Date of Patent: Aug. 20, 1991

[54] PROCESS FOR MANUFACTURE OF SHAPED POLYETHYLENE TEREPHTHALATE STRUCTURES IN THE PRESENCE OF MOLECULAR SIEVE CATALYST

[75] Inventor: Robert C. Jackson, Florence, S.C.

[73] Assignee: E. I. du Pont de Nemours and Company, Wilmington, Del.

[21] Appl. No.: 497,069

[22] Filed: Mar. 20, 1990

Related U.S. Application Data

[63] Continuation-in-part of Ser. No. 251,246, Sep. 30, 1988.

[51] Int. Cl.[5] ............................................. C08G 63/82
[52] U.S. Cl. .................................... 528/272; 528/277;
528/279; 528/281; 528/282; 528/308.1;
528/308.3; 524/730; 524/789
[58] Field of Search ............... 528/272, 277, 279, 281,
528/282, 308.1, 308.3; 524/730, 789

[56] References Cited

U.S. PATENT DOCUMENTS 3,876,608  4/1975  Anderson et al. .................. 523/218

Primary Examiner—John Kight, III
Assistant Examiner—Sam A. Acquah
Attorney, Agent, or Firm—Paul R. Steyermark

[57] ABSTRACT

In a process for the manufacture of shaped polyethylene terephthalate structures, such as film or fiber, a crystalline sodium aluminosilicate molecular sieve is used as the catalyst for the polymerization of di(2-hydroxyethyl phthalate) or higher oligomer intermediate. In film, especially for audio and video tapes, the molecular sieve serves both as the catalyst and as a slip additive. In addition to the fact that this process eliminates antimony trioxide, heretofore used as the polymerization catalyst, the polyethylene terephthalate film made by the process of this invention has considerably fewer defects such as microgel inclusions, black specks, and pimples. Further, the amount of diethylene glycol formed in the process is reduced. Finally, polyethylene terephthalate degradation, contributing to the exudation of lower molecular weight materials, also is reduced.

10 Claims, No Drawings

PROCESS FOR MANUFACTURE OF SHAPED POLYETHYLENE TEREPHTHALATE STRUCTURES IN THE PRESENCE OF MOLECULAR SIEVE CATALYST

CROSS REFERENCE TO RELATED APPLICATION

This is a continuation-in-part of my copending application Ser. No. 07/251,246, filed Sept. 30, 1988.

BACKGROUND OF THE INVENTION

Shaped structures of polyethylene terephthalate (sometimes abbreviated herein to PET), such as, for example, film and fibers, are well established commercial products. The film finds numerous applications, e.g., in packaging, photographic film base, and audio and video tape. PET films sometimes are difficult to handle, and especially to wind, because of the tendency of adjoining film layers to cling to one another. This problem can be solved, however, by adding to the film-forming material, prior to the extrusion of the film, certain fillers or slip additives, including certain crystalline sodium aluminosilicates, for example, as described in U.S. Pat. Nos. 3,876,608 to Anderson et al.

PET is commercially produced by a two-step process which comprises as the first step either ester interchange (or transesterification) between ethylene glycol and dimethyl terephthalate, preferably catalyzed by zinc acetate in the presence of a lithium compound such as, e.g., lithium glycolate, to produce di(2-hydroxyethyl) terephthalate (sometimes abbreviated herein as DHET), or direct esterification of terephthalic acid with ethylene glycol, which in the first step produces an oligomer having up to about ten repeating units. In the second step, either DHET or the oligomer, as the case may be, is polymerized to polyethylene terephthalate at an elevated temperature and at a reduced pressure. The polymerization step requires a catalyst, and a common catalyst for this step is antimony trioxide, as disclosed in U.S. Pat. No. 2,647,885 to Billica.

While antimony trioxide is an excellent catalyst, it nevertheless has various drawbacks, such as producing in the film defects such as black specks, large area polarization defects, and pimple rejects caused by polymer inclusions. Further, in other applications, for example, in making fibers, antimony trioxide, which often contains impurities, imparts undesirable color to the product. It also appears that a reaction between antimony trioxide and ethylene glycol occurs, producing a fairly volatile compound, which has a tendency to form deposits in the extruding equipment as well as in the spinnerets through which fibers are spun, so that they may affect the shape or the size of the fibers. Other, nonvolatile antimony compounds precipitate from the process stream and cause fouling of reaction vessels.

Finally, it is expected that with increasing concern about environmental problems, use of antimony trioxide may be limited or restricted in the future.

It, therefore, would be highly desirable to be able to produce the polymer in the presence of a catalyst which would not have all the above shortcomings.

SUMMARY OF THE INVENTION

According to the present invention, there is provided in a process for manufacturing a shaped polyethylene terephthalate structure, which process comprises the steps of causing ethylene glycol to react with an esterification partner selected from the group consisting of terephthalic acid and dimethyl terephthalate, to form a low molecular weight intermediate, converting the resulting intermediate to polyethylene terephthalate by heating it at a reduced pressure in the presence of a polymerization catalyst, and forming the resulting polyethylene terephthalate in the melt into a shaped structure, the improvement comprising using crystalline sodium aluminosilicate molecular sieve having an average particle size of about 0.5–2.0 micrometers and a pore size such that it adsorbs molecules having an effective diameter of up to about 10 A, in an amount of about 900–2700 ppm, based on the final shaped article, as the polymerization catalyst for the intermediate, no antimony compound catalyst being used.

DETAILED DESCRIPTION OF THE INVENTION

The process of the present invention can be conducted essentially in the same manner as the processes heretofore employed in the industrial practice, except that the antimony trioxide catalyst is eliminated from the polymerization step.

Crystalline sodium aluminosilicate molecular sieve is a commercial, synthetic zeolite. Typical suitable zeolites include those available from Union Carbide Co. under the names Linde Molecular Sieve ® Type 13X and Type 4A. The former can be represented by the following formula:

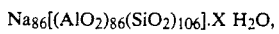

$$Na_{86}[(AlO_2)_{86}(SiO_2)_{106}] \cdot X\ H_2O,$$

where the value of X depends on the degree of hydration of the material. The activated material can adsorb about one third of its weight of water, but the commercial material contains less than 1.5 to less than 2.5% of water, depending on its particle size.

It has a pore size such that it can adsorb molecules having an effective diameter of up to about 10 A, and especially those that are adsorbed on molecular sieves of types 3A, 4A, and 5A.

The second zeolite has the formula:

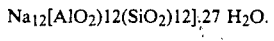

$$Na_{12}[AlO_2)12(SiO_2)12] \cdot 27\ H_2O.$$

Generally speaking, the usual commercial crystalline sodium aluminosilicates which can be ground to the desired particle size are suitable in the process of this invention. This catalyst is retained in the PET and in the final fabricated, shaped structure, but it is not considered harmful; and, in fact, it is desired in the film as a slip additive, as discussed above.

The amount of sodium aluminosilicate should be at least about 900 ppm. For PET film, the preferred amount is about 1100–1550 ppm, based on the final PET film, since at this level it provides the optimum slip properties. For fiber manufacture as well as for most other uses, the preferred amount of sodium aluminosilicate is about 1000–1800 ppm, based on the final shaped structure because at this level it produces PET of sufficient molecular weight to be useful for its intended purposes, without adversely affecting the appearance or the performance of the final shaped structure. Since the catalyst is retained in the PET product, it is recommended to use in such other applicatons the lowest amount of catalyst which produces PET of sufficient molecular weight for the intended purpose; however, a larger amount of catalyst will not impair the quality of the product, although it is likely to adversely affect its appearance. The commercial material, which may have an average particle size of about 2-10 micrometers (5.0 micrometers for Linde ® Type 13X), is finely ground to the desired average particle size. For example, for the video tape, the average particle size is about 0.5 micrometer, while for other applications such as, e.g., audio tape, it can be larger, within the specified range. For use in fibers and shaped structures in which the molecular sieve does not have a separate function, such as improving slip, the fine size of about 0.5-1 micrometer is satisfactory.

In the preferred amounts, this zeolite, in addition to being an excellent polymerization catalyst, also provides a good degree of slip for the PET film. Within the range of 900-1000 ppm, winding of the film may be more difficult, while above 2700 ppm, the zeolite may cause undesirable surface characteristics such as, e.g., excessive roughness or loss of clarity. In general, the amount of sodium aluminosilicate molecular sieve used in this application depends more on the surface quality and customer acceptance than on its catalytic activity.

In a preferred embodiment of this invention, the initial esterification reaction will be conducted in a continuous manner, although a batch process also can be employed. For each mole of esterification partner, two moles of ethylene glycol are fed - in the case of transesterifcation of dimethyl terephthalate, together with the transesterification catalyst, which preferably is zinc acetate together with lithium glycolate—to a reactor maintained at a temperature of about 235° C. and a pressure of about 36 kPa at a rate such that the residence time is about 70-80 min. The amount of zinc, as zinc acetate, is about 50 ppm, and that of lithium, as lithium glycolate, is about 20 ppm, both based on the final film. Lithium glycolate is used both as a diethylene glycol formation inhibitor and as an ester interchange catalyst. In the case of direct esterification, no catalyst is necessary; see, e.g., U.S. Pat. No. 4,340,550 to Ho.

Methyl alcohol formed in the transesterification reaction is continuously removed from the reactor and is recycled to the esterification of terephthalic acid. Sodium aluminosilicate molecular sieve is added to DHET formed in the transesterification step and is continuously preheated to about 260° C. at a pressure gradually decreasing along its path from about 13.3 kPa to 4 kPa, to remove excess ethylene glycol.

The so concentrated material then is subjected to a still higher temperature of about 285-290° C. and a lower pressure of about 0.67 kPa, to complete the polymerization reaction. Ethylene glycol formed in this step is removed at the reduced pressure and recycled.

In the case of direct esterification, the solid oligomer intermediate may be isolated and then introduced into a separate polymerization reactor but usually is piped to the polymerization vessel without isolation.

PET resin obtained in this process is then fabricated into the final product. It thus can be extruded into a film, which advantageously is stretched in a conventional manner in the machine direction and, optionally, in the transverse direction; or it can be melt-spun into fibers in a manner known to the art.

In comparative plant runs of film-manufacturing process, employing sodium aluminosilicate molecular sieve at the level of 1325 ppm, PET film production rate was maintained at the same level in the absence and in the presence of 400 ppm of antimony trioxide catalyst at the DHET polymerization stage, this being the only difference between those runs.

In addition to the surprising fact that the elimination of antimony trioxide from the usual commercial process has not reduced the efficiency of the polymerization reaction, an additional benefit has been realized in that the PET film produced by the improved process of this invention has a lower incidence of defects such as large area polarization (LAP) defects, black specks, and pimples. Further, the film-extruding equipment can be operated with longer intervals between cleanups because of a lower exudation rate.

Exudation is primarily due to cyclic ethylene terephthalate oligomer (principally trimer), which is always formed in equilibrium reactions through the entire polymerization process and is believed to be unavoidable, accompanied by smaller amounts of low molecular weight PET degradation products. These materials collect especially around the extruder's die. The improvement caused by the elimination of antimony trioxide appears to reduce the amount of low molecular weight PET degradation products.

Film made according to this process in plant-size equipment, which had a thickness of 14 micrometers and had a degree of stretch of approximately 3.5 times in the machine direction and 4.0 times in the transverse direction, was examined according to the standards adopted for commercial PET film. In the LAP test, using a piece of polarized plastic, about $25 \times 37.5$ cm, and examining the film under polarized light, microgel inclusions and very small black particles, which tend to shine under these conditions, are counted. Three fields of view (total area of about 2 $m^2$) are examined, and the total number of defects found in those three fields is added.

When operating according to the earlier process, in which 400 ppm of antimony trioxide had been used, the number of such LAP defects was about $2-6/m^2$. After eliminating antimony trioxide from the process, this FIGURE gradually decreased within 48 hours to $0/m^2$ and remained at that level.

Black specks (larger black particles) and pimple defects also were virtually completely eliminated from the PET film made by the process of the present invention. Pimples are polymer inclusions or air borne contamination. Pimples caused by polymer inclusions, black specks, and LAP defects all are primarily wall scale that forms on transfer line piping and sloughs off, causing defects in the film. About 90% of such defects had been found to contain antimony.

The elimination of antimony trioxide also had a desirable side effect of reducing the amount of diethylene glycol from 1.98 to 1.61%. Diethylene glycol normally is formed from ethylene glycol during polymerization and is incorporated into the polymer chain. At high levels, it adversely affects such film properties as. e.g., its tensile strength and high temperature resistance. Antimony trioxide is known to enhance diethylene glycol formation from glycol.

Further laboratory experiments were carried out as follows.

PET was prepared in the laboratory by heating the indicated materials in glass tubes in a resistance-heated metal block. The starting material was in all cases an oligomer prepared by the direct esterification of terephthalic acid with ethylene glycol. It had an average molecular weight of about 1350 and had an average number of seven repeating units. Its freezing point was 245° C. The carboxyl group level was about 750 microequivalents per gram. It is noted that the number of free carboxyl groups is not necessarily related to the molecular weight of oligomer but distinguishes this oligomer from the intermediate obtained from dimethyl terephthalate, which intermediate has almost exclusively hydroxyl end groups. Surprisingly, molecular sieves very effectively catalyze the polymerization of both types of intermediates.

Antimony trioxide catalyst was used as a 1% solution in ethylene glycol. Molecular sieve catalyst was Linde Molecular Sieve ® 13X, type 9356, which had a nominal pore size of 10 A, obtained from Union Carbide Corporation. It was added as a 10% suspension in ethylene glycol. The suspension was repeatedly milled and filtered to remove large particles.

In each case, 35 g of oligomer and the amount of catalyst necessary to obtain the indicated catalyst level was introduced into each reaction tube. Sufficient amount of ethylene glycol was added to bring the total amount of ethylene glycol to 1.04 g. The tubes were placed in the heating block and heated to 285° C. over a two-hour period to melt the oligomer. A glass capillary was introduced into each tube to provide agitation with nitrogen; the tubes were closed and evacuated to a pressure of less than about 200 Pa over a period of 15 minutes, then maintained at this pressure for 90 minutes. During that period, water and ethylene glycol were removed. Pressure was finaly raised to atmospheric; the tubes were removed from the heating block; the resulting polymers were removed from the tubes, cooled further, and ground into small chips for analysis. The results are given in the following Table:

Table

| Cat., | ppm | LRV[1] |
|---|---|---|
| MS[2], | 975 | 18.17 |
| MS[2], | 600 | 13.91 |
| Sb$_2$O$_3$, | 190 | 19.58 |
| None | | 13.78 |

[1]Relative viscosity, defined in U.S. Pat. No. 4,444,710 (to Most) as the ratio at 25° C. of the flow times in a capillary viscometer for a 4.75 weight percent solution of polymer and solvent. The solvent is hexafluoroisopropyl alcohol containing 100 ppm of sulfuric acid.
[2]Molecular sieve.

The above example shows that PET having nearly the same relative viscosity was obtained in the presence of 975 ppm of molecular sieve as in the presence of 190 ppm of antimony trioxide. On the other hand, in the presence of 600 ppm of molecular sieve, PET of rather low viscosity was obtained, about the same as in the absence of a catalyst. In the manufacture of PET fibers, a relative viscosity above about 17 is satisfactory. An amount of about 190 ppm of antimony trioxide has been routinely used heretofore in the plant as the catalyst when polymerizing oligomer made by the direct esterification of ethylene glycol with terephthalic acid.

I claim:

1. In a process for manufacturing a shaped polyethylene terephthalate structure, which process comprises the steps of
    causing ethylene glycol to react with an esterification partner selected from the group consisting of terephthalic acid and dimethyl intermediate,
    converting the resulting intermediate to polyethylene terephthalate by heating it at a reduced pressure in the presence of a polymerization catalyst, and
    forming the resulting polyethylene terephthalate in the melt into a shaped structure,
    the improvement comprising using crystalline sodium aluminosilicate molecular sieve having an average particle size of about 0.5–2.0 micrometers and a pore size such that it adsorbs molecules having an effective diameter of up to about 10 A, in an amount of about 900–2700 ppm, based on the final shaped article, as the polymerization catalyst for the intermediate, no antimony compound catalyst being used.

2. The process of Claim 1 wherein the shaped structure is a film, and the amount of crystalline sodium aluminosilicate molecular sieve is 100–1550 ppm, based on the film.

3. The process of Claim 1 wherein the shaped structure is a fiber, and the amount of crystalline sodium aluminosilicate molecular sieve is 000–1800 ppm, based on the fiber.

4. The process of Claim 1 wherein the intermediate is made by transesterification of dimethyl terephthalate, and the transesterification step is carried out in the presence of catalytic amounts of zinc acetate and of a lithium compound.

5. The process of Claim 4 wherein the lithium compound is lithium glycolate.

6. The process of Claim 1 which is a continuous dimethyl terephthalate transesterificaton process.

7. The process of Claim 1 wherein the shaped structure is a film, and the molecular sieve used as polymerization catalyst is retained therein in sufficient amount to serve as slip additive.

8. The process of Claim 1 wherein the intermediate is an oligomer having predominantly carboxyl end groups having up to ten repeating units, which is made without a catalyst.

9. The process of Claim 8 wherein the intermediate is isolated and fed to a separate polymerization reactor.

10. The process of Claim 1 wherein the inermediate is subjected to polymerization without being isolated.

* * * * *

UNITED STATES PATENT AND TRADEMARK OFFICE
CERTIFICATE OF CORRECTION

PATENT NO. : 5,041,525

DATED : August 20, 1991

INVENTOR(S) : Robert C. Jackson

It is certified that error appears in the above—identified patent and that said Letters Patent is hereby corrected as shown below:

Claim 1, Column 6, line 12, after "dimethyl" add -- terephthalate, to form a low molecular weight --.

Claim 2, Column 6, line 29, "100-1550 ppm," should read -- 1100-1550 ppm, --.

Claim 3, Column 6, line 33, "000-1800 ppm," should read -- 1000-1800 ppm, --.

Signed and Sealed this

Twenty-ninth Day of September, 1992

Attest:

DOUGLAS B. COMER

Attesting Officer

Acting Commissioner of Patents and Trademarks